April 4, 1950      E. LAXO      2,502,859

LATCH OPERATED CLUTCH

Filed Dec. 24, 1946      2 Sheets-Sheet 1

INVENTOR.
ED LAXO

BY Mellin and Hanscom
ATTORNEYS

April 4, 1950

E. LAXO 2,502,859

LATCH OPERATED CLUTCH

Filed Dec. 24, 1946

INVENTOR.
ED LAXO
BY
Mellin and Hanscom
ATTORNEYS

Patented Apr. 4, 1950

2,502,859

UNITED STATES PATENT OFFICE 2,502,859

LATCH OPERATED CLUTCH

Ed Laxo, Oakland, Calif., assignor to Atlas Imperial Diesel Engine Co., Oakland, Calif., a corporation of Delaware Application December 24, 1946, Serial No. 718,213

8 Claims. (Cl. 192—29)

The present invention relates to clutches, and more particularly to clutches which are automatically disengageable upon a predetermined extent of rotation of the driven clutch member.

An object of the present invention is to provide an improved clutch which is automatically releasable at a predetermined point in the operating cycle of the mechanism to which it is applied, regardless of the position or movement of a control member effective to institute engagement of the clutch.

A further object of the invention resides in the provision of a cam controlled clutch whose clutch elements are engageable or disengageable only upon their occupying predetermined rotational positions with respect to the cam control member.

Another object of the invention is to provide a clutch whose engagement and disengagement is controlled by an axially movable cam adapted to permit engagement of the clutch upon axial movement of the cam in one direction, the cam moving axially in the other direction to effect disengagement of the clutch only upon rotation of the clutch to a predetermined angular position with respect to the cam.

Still another object of the invention is to provide a driving pulley clutch member shaped to function as a handwheel.

One form which the invention may assume is exemplified in the following description and illustrated by way of example in the accompanying drawings in which.

Figure 1:
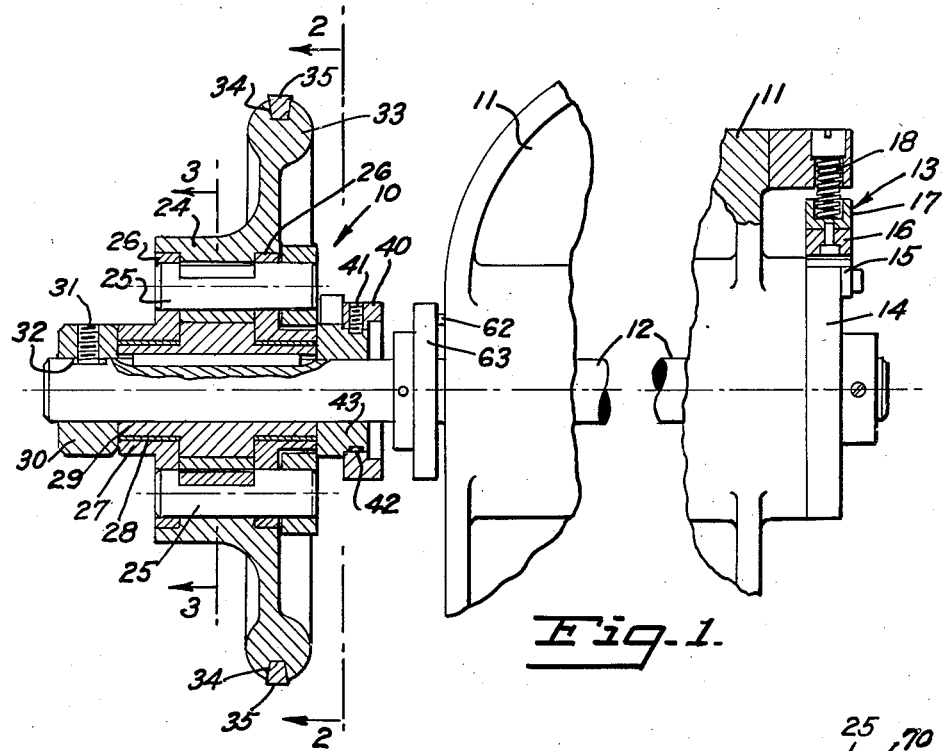
Fig. 1 is a partial front elevation of segments of a can body lockseamer, with certain parts in section.
Figure 2:
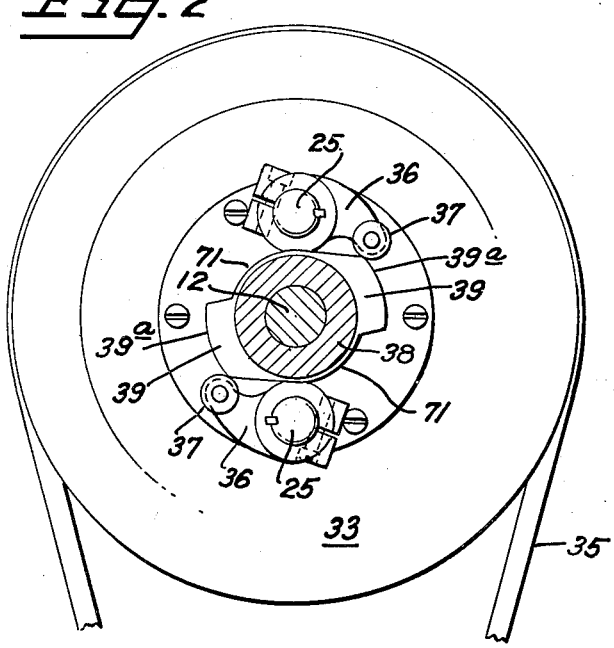
Fig. 2 is a transverse view taken along the line 2—2 on Fig. 1.
Figure 3:
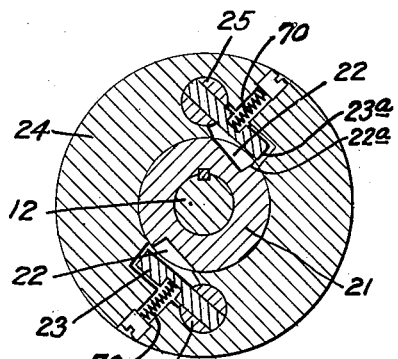
Fig. 3 is a cross-section taken along the line 3—3 on Fig. 1.

A clutch mechanism 10 embodying the present invention is disclosed in the drawings as constituting part of a single blow lockseamer for both forming and locking the side seams on can bodies. This machine includes a frame 11 in which the forming and locking mechanism is supported and operated, such operating mechanism including a drive shaft 12 extending through the machine and having the clutch mechanism associated with it at one end of the machine frame and a brake mechanism 13 attached to it at the other end of the machine frame. The brake mechanism may include a peripheral member 14 secured to the shaft 12 and provided with a brake segment 15 bolted thereto, which is engageable with a brake shoe 16 supported in a brake lever 17 suitably pivoted on the machine frame 11, the lever and shoe being urged into braking engagement with the segment by a spring 18. Downward movement of the brake lever 17 and shoe 16 is limited by a pin 19 pivotally attached to the end of the brake lever and having a suitable stop nut 20 threaded on its upper end engageable with the machine frame.

The main drive shaft 12 of the machine has a one revolution, non-repeat clutch device 10 associated with it. This clutch device includes an inner driven clutch member 21 keyed on the drive shaft and having a central portion provided with a pair of diametrically opposed recesses or pockets 22 adapted to receive the ends of pawl blades 23 mounted on the driving clutch member 24 and secured to trunnion shafts 25 extending through opposed bearing flanges 26 attached to the central portion of the driving clutch member. The hub portions 27 of the flanges 26 are rotatably mounted on bearing bushings 28 encompassing the hub extensions 29 of the driven clutch member 21. A suitable retainer collar 30 is disposed on the end of the drive shaft 12 and has a set screw 31 extending through it into engagement with a pocket 32 in the shaft to prevent endwise movement of the operating clutch parts and hold them in appropriate assembled relation on the drive shaft.

The driving clutch member 24 is in the form of a pulley having a generally toroidally shaped rim 33 provided with a central peripheral V-shaped groove 34 in which a driving V-belt 35 runs. The belt is connected to a suitable prime mover mechanism (not shown) in such manner as to rotate the pulley 24 at the appropriate, desired rate of speed. It is to be noted that the shape of the pulley rim 33 is such as to provide a handwheel allowing the pulley to be grasped readily by the operator and rotated in either direction, as conditions may require.

The pawl shafts 25 extend outwardly from the inner bearing flange 26 and have a pawl arm 36 keyed or otherwise secured thereto, which extends in the direction of rotation of the pulley. Each arm has an axially extending cam follower roller 37 adapted to engage a cam 38 disposed on the shaft 12 and provided with diametrically disposed radial cam lobes 39. The cam is held from rotation on the shaft and is movable axially thereon by being secured to a yoke 40 by set screws 41 received within a peripheral groove 42 in the cam hub 43, against which the screws can be tightened to permit angular adjustment of the cam 38 on the shaft 12 and the attainment of proper timed engagement and disengagement of the pawl blades 23 with and from the driven clutch member 21.

The operating yoke 40 has a transversely extending arm 44 fastened to a slidable operating and clutch control shaft 45 mounted for sliding movement in suitable bearing bosses 46 at the rear of the machine frame 11. This shaft 45 and the attached yoke 40 and cam 38 are urged toward the pawl levers 36, to prevent inward clutch engagement of the clutch pawls 23, by a return spring 47 encircling the shaft and having one end bearing against one of the shaft bearings 46 and its other end against a collar 48 fixed to the slidable shaft 45 by a set screw 49 or the like, which collar has a depending lug 50 engaged by an upstanding finger 51 on a latch lever 52 pivotally mounted on a pin 53 secured to the upper arm 54 of a rocker or bell crank 55 oscillatable on a stud 56 fixed in the machine frame 11. The other arm 57 of the bell crank is mounted on a pivot pin 58 secured to the upper end of a foot treadle operated rod or link 59. The latch 52 is urged in an upward direction, to permit endwise engagement of its finger 51 with the collar lug 50, by a helical spring 60 disposed within a pocket 61 in the bell crank lever 55 and bearing against the latch lever 52.

Disengagement of the latch lever finger 51 from the collar lug 50 is determined by a pin or cap screw 62 extending from the face of a cam member 63 secured to the shaft 12 to rotate therewith. This cap screw is adapted to engage the end of a trip lever 64 secured to a pin 65 oscillatable in a boss 66 on the machine frame 11, the pin extending through the boss to its other side where another lever 67 is secured thereto, which has a finger 68 engageable with a pin 69 projecting laterally from the end of the latch lever 52. The finger 68 extends generally horizontally, as does the latch lever 52, and is of sufficient length to prevent the latch pin 69 from moving out of engagement therewith upon longitudinal movement of the latch lever 52 in response to rocking of the bell crank 55 on its pivot 56.

Figure 4:
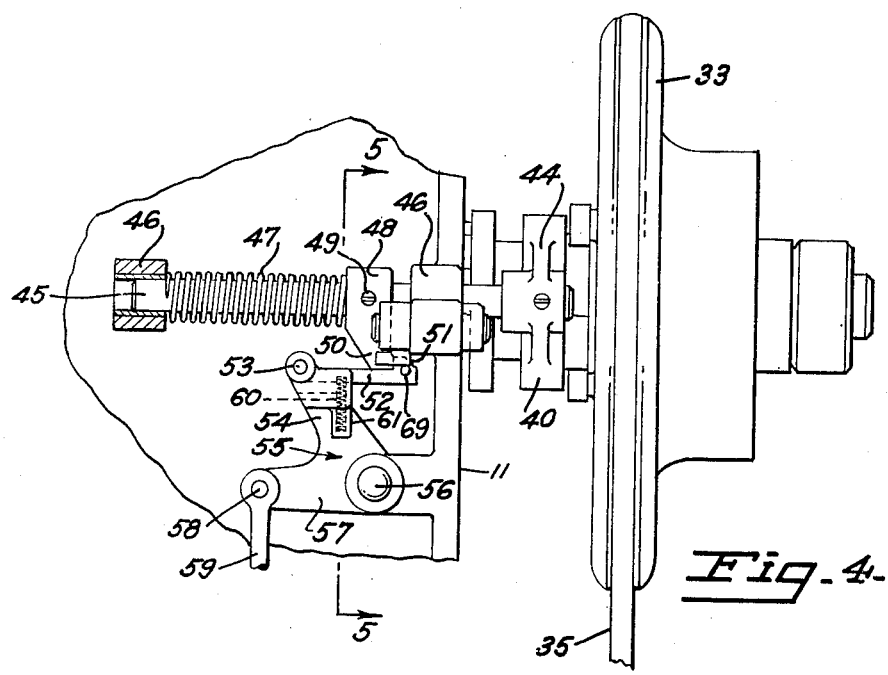
Fig. 4 is an elevation of the clutch and its control mechanism, as seen from the rear of the machine.
Figure 5:
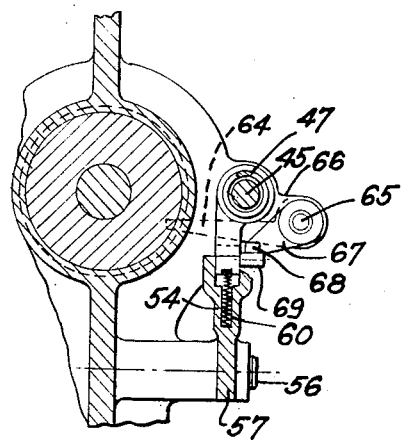
Fig. 5 is a transverse section taken along the line 5—5 on Fig. 4.
Figure 6:
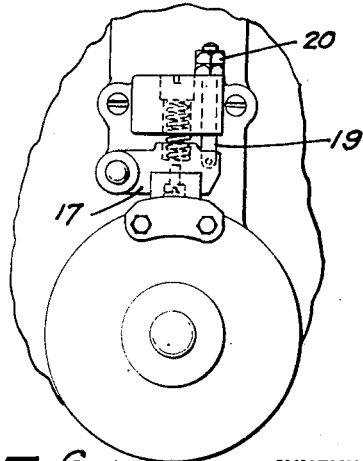
Fig. 6 is an end elevation of the machine as seen from the right of Fig. 1.

In operating and controlling the clutch, a foot pedal (not shown) is depressed to move the link 59 downwardly, rocking the bell crank 55 on its pivot 56 and moving the latch lever 52 to the left, as seen in Fig. 4, which (through engagement of the finger 51 with the lug 50) shifts the slidable clutch shaft 45 to the left against the force of the return spring 47. Such action also carries the yoke 40 and cam 38 to the left, moving the cam out of engagement with and from the plane of revolution of the pawl arms 36 and follower rollers 37, permitting pawl spring 70 carried by the driving clutch member 24 and engaging the pawl blades 23 to force the latter inwardly into the recesses 22 in the driven clutch member 21, with the ends 23a of the pawls engaging the forward faces 22a of the recesses 22, thus effecting a driving connection between the driving and driven clutch members. The rotation of the pulley 24 is now transmitted to the driven clutch member 21 and to the operating shaft 12, rotating the shaft and producing movement of the mechanism within the machine for forming and locking a side seam in a can body mounted in the machine.

The cam control arrangement is such that the shaft 12 is driven positively by the driving pulley 24 during each cycle of operation of the machine no more than one revolution, the clutch being released automatically by the axially movable cam 38 at some point during such shaft revolution to prevent repetition of the cycle of machine operation, despite the fact that the foot controlled operating link 59 has not been released to reassume its upper position. Such release of the clutch is obtained upon engagement of the cap screw 62 on the cam 63 with the trip lever 64, which rotates the stud 65 a partial revolution and moves the finger 68 on the other lever arm 67 downwardly against the latch pin 69, shifting the latch 52 downwardly and its finger 51 from engagement with the collar lug 50, thereby releasing the collar 48 and allowing the spring 47 to shift the shaft 45, together with the attached yoke 40 and cam 38 to the right (as seen in Fig. 4), to a position in which the cam lobes 39 are within the plane of revolution of the pawl arms 36 and followers 37. The followers 37 ride upon the periphery of the cam lobes to hold the pawls 23 from engaging the recess faces 22a on the driven clutch member 21, thus freeing the driven clutch member from driving relation with the driving clutch member 24, and allowing the shaft 12 to be arrested upon engagement of the brake segment 15 on the disk 14 with the brake shoe 16. It is to be noted that the segment is so arranged as to engage the brake shoe subsequent to the cam lobe release of the pawls 23 from driving relation against the driven clutch member faces 22a.

Automatic release of the clutch occurs at a proper timed sequence in the cycle of machine operation, depending upon the position of the cap screw 62 in the face of the cam 63. The mechanism cannot be operated again until the foot pedal is first released to permit the link 59 to be elevated by a spring (not shown), which shifts the latch lever 52 back to a position in which its finger 51 abuts the end face of the collar lug 50.

The cam lobes 39 on the clutch releasing cam 38 are so disposed with respect to the ends of the pawl arms 36 that the latter members ride up upon the periphery of the cam lobes, to keep the pawls 23 out of the driven clutch recesses or pockets 22, whenever the pawls would otherwise be in position for movement into such pockets under the influence of their engaging springs 70. Between the cam lobes 39, low arcuate cam surfaces 71 are provided, which allow inward movement of the pawl blades 23. However, when the arm follower rollers 37 are engaging the low cam peripheries 71, the pawl blades 23 are disposed between the pockets 22 and slide freely along the circular periphery of the driven clutch member 21 without imparting any rotation to the latter. As the driving pulley 24 rotates and moves the pawls 23 to a position adjacent their cooperable pockets 22, the pawl arm followers 37 ride upon the peripheries of the high portions or cam lobes 39, which move the pawls 23 outwardly completely from the clutch pockets 22 and prevents engagement of their ends 23a with the cooperable faces 22a of the pockets.

It is to be noted that the transverse faces 39a of the high cam lobes 39 extend outwardly to enable their overlapping the side faces on the pawl arms 36 and their cam follower rollers 37. The side faces on the low cam surface segments 71 do not so overlap the cam arms and follower rollers. Accordingly, the return spring 47 can only move the cam 38 inwardly within the plane of revolution of the pawl arm followers 37 upon positioning the ends of the arms 36 and their followers adjacent the low surfaces 71 on the cam, since the transverse faces 39a of the high lobes on the cam would otherwise engage the arm ends and prevent such inward axial movement to the desired extent. It is seen, therefore, that the cam 38 is only effective to release the pawls 23 from driving engagement with the driven clutch member 21 upon the pawl arms 36 occupying a predetermined position around the periphery of the cam 38, namely, with their follower rollers 37 out of longitudinal alignment with the cam lobes 39.

A clutch mechanism has been provided in which the clutch is engageable only at a predetermined point during the rotation of the driving member 24, and is releasable at a predetermined timed sequence in dependence upon the extent of rotation of the driven clutch member 21. The manual control, determining engagement and disengagement of the clutch, possesses the non-repeat feature of being unable to institute another clutch operating cycle unless the manual control mechanism is first moved by the operator to its initial operating position.

While I have described a preferred form of my invention, it is to be understood that various changes may be made therein without departing from the spirit of the invention as defined by the appended claims.

Having thus described my invention, what I claim and desire to secure by Letters Patent is:

1. A clutch mechanism, including a driving member, a driven member having a recess terminating in a face, a pawl on said driving member engageable with said face, spring means on said driving member for urging said pawl into said recess, an operating arm secured to said pawl and having a cam engaging end, a non-rotatable cam movable axially to and from the plane of revolution of the end of said arm, said cam having a peripheral low cam surface and a radial lobe providing a transverse face engageable with the end of said arm to prevent movement of said cam into the plane of revolution of said arm end, said low cam surface permitting axial movement of said cam upon revolution of the end of said arm to an aligned position with said low cam surface, said low cam surface and radial lobe being so proportioned and arranged with respect to said arm end that said pawl is out of its recess face engaging position during engagement of said arm end with said low cam surface, said arm end engaging the periphery of said cam lobe to prevent said pawl from being moved by said spring means into said recess.

2. A clutch mechanism, including a shaft, a driven member secured to said shaft and having a recess terminating in a face, a driving member rotatable about said driven member, a pawl on said driving member engageable with said face, an operating arm secured to said pawl and having a cam engaging end, a non-rotatable cam on said shaft movable axially to and from the plane of revolution of said arm end, said cam having a peripheral low cam surface merging into a radial lobe providing a transverse face engageable with said arm end to prevent axial movement of said cam into the plane of revolution of said arm end, said low cam surface permitting such axial movement of said cam upon alignment of said arm end with said low cam surface, said low cam surface and radial lobe being so proportioned and arranged with respect to said arm end that said pawl is out of its recess face engaging position during contact with said arm end with said low cam surface, said arm end engaging the periphery of said cam lobe to prevent movement of said pawl into said recess upon transverse alignment between said pawl and recess.

3. A clutch mechanism, including driving and driven members, a pawl for effecting a driving connection between said members, an operating arm secured to said pawl, an axially movable cam having a radial cam lobe engageable with said arm to hold said pawl from effecting a driving connection between said members, a yoke secured to said cam, a slidable shaft secured to said yoke, spring means for urging said shaft axially in one direction, and manually operable means for shifting said shaft axially in the opposite direction.

4. A clutch mechanism, including driving and driven members, a pawl for effecting a driving connection between said members, an operating arm secured to said pawl, an axially movable cam having a radial cam lobe engageable with said arm to release said pawl from its driving connection between said members, means for axially moving said cam comprising spring means for urging said cam in one direction to pawl releasing position, manually operable means for moving said cam in the opposite direction against the force of said spring means, said manually operable means including a latch engageable with said spring means, and means responsive to rotation of said driven member for releasing said latch from said spring means.

5. A clutch mechanism, including a main shaft, a driven member secured to said shaft, a driving member rotatable about said driven member, a pawl on said driving member for effecting a driving connection with said driven member, an operating arm secured to said pawl, an axially movable cam having a radial cam lobe engageable with said arm to hold said pawl from its driving connection with said driven member, a yoke secured to said cam, a slidable shaft secured to said yoke, spring means for urging said slidable shaft axially in one direction to shift said cam to pawl releasing position, manually operable means for shifting said slidable shaft axially in the opposite direction including a latch engageable with said spring means, and means secured to said main shaft for releasing said latch from said spring means.

6. In a clutch mechanism comprising concentrically disposed driving and driven shafts, a pawl pivotally supported to engage said shafts when in a first pivotal position and to disengage said shafts when in a second pivotal position, means resiliently urging said pawl into said first pivotal position and a cam shiftable axially to and from an axial position wherein said cam pivots said pawl to said second pivotal position, the improvement which comprises resilient means urging said cam to said axial position, means for shifting said cam in opposition to said resilient means, said shifting means including a trip member adapted to be tripped to release said shifting means and render the same inoperative, and tripping means including a rotary member secured to one of said shafts, said tripping means being operable to trip said trip member when said rotary member is in a predetermined rotary position.

7. The clutch mechanism of claim 6, wherein said shifting means includes a first, manually operable lever, and said trip member comprises a second lever pivotally secured to said first lever and urged resiliently to operative position opposing said resilient means.

8. The clutch mechanism of claim 7, wherein said tripping means comprises a disc secured to said driven shaft and having a pin projecting therefrom and lever means supported for pivotal movement, engageable with said pin and operable upon engagement with said pin to pivot said second lever to inoperative position.

ED LAXO.

REFERENCES CITED

The following references are of record in the file of this patent:

UNITED STATES PATENTS

| Number | Name | Date |
| --- | --- | --- |
| 470,797 | Wheeler | Mar. 15, 1892 |
| 649,147 | Towse | May 8, 1900 |
| 928,871 | Lint | July 20, 1909 |